D. M. WESTON.
Improvement in Clutch Mechanism.
No. 119,677.
Patented Oct. 3, 1871.
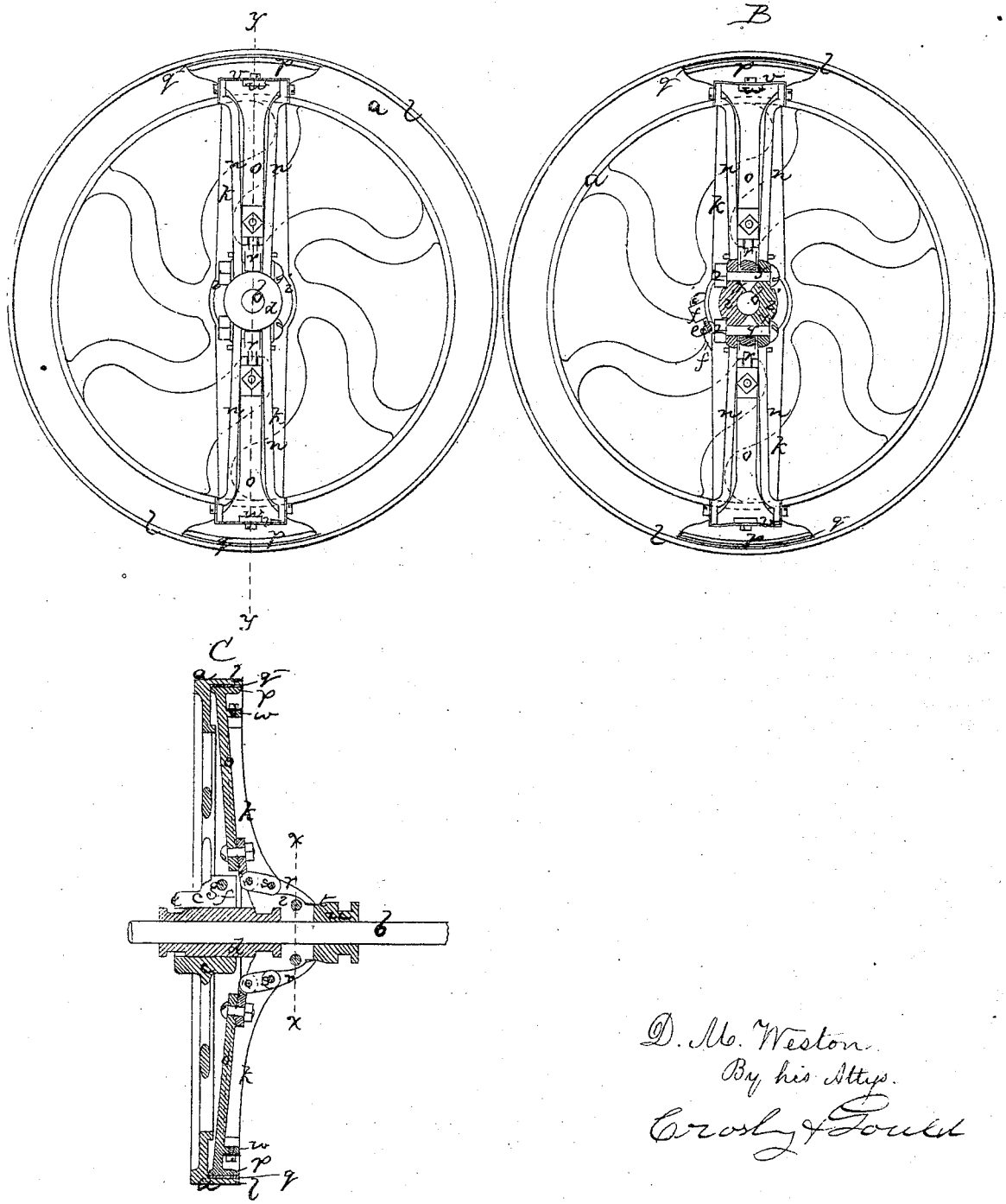

119,677

UNITED STATES PATENT OFFICE.

DAVID M. WESTON, OF BOSTON, MASSACHUSETTS.

IMPROVEMENT IN CLUTCH MECHANISMS.

Specification forming part of Letters Patent No. 119,677, dated October 3, 1871.

*To all whom it may concern:*

Be it known that I, DAVID M. WESTON, of Boston, in the county of Suffolk and State of Massachusetts, have invented an Improved Wheel-and-Clutch Mechanism; and I do hereby declare that the following, taken in connection with the drawing which accompanies and forms part of this specification, is a description of the invention sufficient to enable those skilled in the art to practice it.

My invention relates to the construction of a friction-clutch mechanism which, being connected with a driving-shaft and arranged to drive by friction a pulley loose upon the shaft, is thrown into action with such pulley (to establish such frictional contact between the clutch-shoe brake or binder and the rim of the pulley as shall cause the pulley to be driven with the clutch) by centrifugal force, the clutch-shoe or binder being normally controlled or partially controlled by a spring, the spring permitting the clutch-shoe to be thrown outward by centrifugal force, restraining or increasing the friction, as required, by adjustment of the springs, the springs forming the support for the outer ends of the jaws and connecting the two outer ends of the arms. It is in the combination with the rotary pulley of the clutch or clutches thrown outward by centrifugal force, and the stress of the spring or springs, and inward by a suitable lever mechanism, that the invention primarily consists; or in using the centrifugal force produced by the weight of the friction-jaws, in combination with the spring, to control the amount of friction required with the given speed of the driving-shaft, the springs serving to support the outer ends of the jaws and also to connect the outer ends of the arms.

The drawing represents a pulley-and-clutch mechanism embodying the invention. A is an end view of the same. B is a sectional elevation on the line *x x*. C is a sectional elevation on the center line *y y*.

*a* denotes the pulley by which rotary motion is to be gradually imparted to the centrifugal or other machine to be driven. This pulley runs loosely on the main shaft *b*, its hub *c* being directly fastened to a sleeve, *d*, which turns on the shaft. The hub is split, as seen at *e*, and the two ears *f f* of the hub are connected by a screw-bolt, *g*, the nut upon the screw-threaded end of which draws the two ears together and tightly secures the hub ubon the sleeve, so that there can be no relative rotation between them, while by loosening the nut the pulley can be readily slipped from the sleeve. *i* denotes a hub made in halves, clamped upon the shaft *b*, and having extending from it diametric arms *k k*, which extend out toward but not quite to the peripheral flange *l* of the pulley *a*. Each arm *k* is slotted, or is made with two branches, *n n*, between which is placed the shank *o* of a jaw or shoe, *p*, the outer curved surface of which (or the surface of a friction-shoe, *q*, applied thereto) fits to the inner surface of the rim *l* of the pulley. The inner end of the shank *o* of each shoe is jointed to one end of a lever, *r*, (fulcrumed at *s*,) the opposite end of which extends over an incline, *t*, on a slide, *u*. Across the ends of the two branches *n n* of each arm *k* extends a spring, *v*, the opposite ends of which are fastened to the two branches, while at the center it is fastened to a stud, *w*, extending from the shank *o* of the shoe.

When the slide-pulley *u* is pressed up to force the inclines *t* under the levers *r* (so as to lift or throw out the arms of the levers) the shanks of the shoes are drawn radially inward, so that the shoes are inoperative upon the pulley-rim; but when the slide is thrown out, leaving the levers *r* free, the springs *v* will permit the shoes to be thrown out by centrifugal force, and the weight of each shoe and its jaw is such that a high speed of the driving-shaft will be sufficient to hold the clutch in contact against the pulley-rim, so as to gradually start the pulley and carry it along with the shoes until, finally, the pulley-and-clutch mechanism move as one.

The clutch or hub *i* is made in two parts or halves, *x x'*, as seen at B, the halves embracing the shaft, and being confined fast thereto by screw-bolts *y* and nuts *z*, so that the clutch mechanism can be readily applied to and removed from the shaft without taking the shaft from its journals.

I claim—

1. In combination with the pulley $a$, the friction-clutches, normally controlled by the springs $v$, and thrown into engagement with the pulley-rim $l$ by centrifugal force and the stress of the springs combined, substantially as described.

2. The pulley $a$ having a split hub, $c$, secured upon the sleeve or bushing by the bolt $g$ and nut $h$, substantially as shown and described.

D. M. WESTON.

Witnesses:
FRANCIS GOULD,
M. W. FROTHINGHAM. (63)